United States Patent Office 3,152,046
Patented Oct. 6, 1964

3,152,046
SELENIUM DISULFIDE DISPERSIONS
Ales Maria Kapral, 14 Broadbent St., Kingsford, near Sydney, New South Wales, Australia
No Drawing. Filed Nov. 9, 1956, Ser. No. 621,198
11 Claims. (Cl. 167—87)

This invention relates to dispersions of selenium disulfide suitable for various uses, particularly for use as therapeutic shampoos, or for therapeutic use in the treatment of skin diseases. This application is a continuation-in-part of my application, Serial No. 609,806 filed September 14, 1956, now abandoned.

The therapeutic value of selenium disulfide is well known and various methods of producing this compound are described, for example, in U.S. Letters Patent Nos. 1,860,154; 1,860,320; 1,860,336 and 2,149,249. Various therapeutic preparations comprising selenium disulfide are described in U.S. Letters Patent No. 2,694,669 as well as in the literature. The known preparations have in common the fact that the selenium disulfide is present in an aqueous suspension and in admixture with inorganic hydrophilic additives and acid stabilizers. However, notwithstanding stabilization, the durability or shelf-life of such aqueous preparations is rather limited, presumably due to the comparatively large size of the particles of selenium disulfide suspended in the aqueous medium.

Furthermore, while the known preparations are effective remedies against dandruff and seborrhoeic dermatitis of the scalp, they have the disadvantageous tendency of making the hair brittle, stringy and lifeless after application.

The present invention provides new dispersions of selenium disulfide which are more stable than known suspensions and which can be used successfully as a shampoo against seborrhoeic dermatitis of the scalp as well as against other skin diseases. The invention also provides new methods suitable for making these dispersions. In extensive tests involving treatment of the hair with the shampoo of this invention, the hair of the users suffered no ill-effects whatsoever and the hair after treatment was soft and flexible, non-stringy and full of life and brilliance. Dispersions according to the invention may be also used as plant protectives, and for veterinary purposes.

It is generally known that it is not possible to prepare chemically active and stable selenium disulfide in aqueous suspension by introducing hydrogen sulfide into a solution of selenious acid since, in addition to a yellow sol, there is also formed a voluminous precipitate of rubber-like consistency which is chemically ineffective and which contains a quantity of unchanged selenius acid.

I have observed, however, that if the precipitation of selenium disulfide from selenium dioxide, or from selenious acid, or from a selenious salt, is effected with hydrogen sulfide in an organic dispersion medium and in the absence of water, a colloidal dispersion of selenium disulfide is formed which is chemically active and has been found to be stable to a high degree.

Hence, in accordance with one aspect of the present invention, active, stabilized selenium disulfide is colloidally dispersed in an organic dispersion medium which is a polyhydric alcohol containing not more than three carbon atoms to the molecule or an ether of such an alcohol. Examples of suitable media are ethylene glycol, propylene glycol, glycerine, diethylene glycol, ethylene glycol mono methyl ether, mono ethylene glycol ethyl ether, ethylene glycol mono butyl ether, diethylene glycol mono methyl ether, diethylene glycol mono ethyl ether and like lower alkyl ethers of polyhydric alcohols. The preferred dispersion medium is glycerine. Preferably the dispersion also includes a detergent which acts as a colloid protective. When the preparation of the invention is to be used as shampoo, the detergent must be normally harmless to the human skin and is suitably one of the detergents described in column 2, lines 4 to 66 of U.S. Letters Patent 2,694,669. Particularly suitable, for example, are a sulfonated long-chain aliphatic alcohol such as sulfonated lauryl alcohol, and alkyl aryl sulfonates such as those sold under the trade designations Nacconol NRSF and Santomerse D. It will be understood, however, that any of the detergents referred to in the above-mentioned patent or their equivalents may be suitably employed.

When the preparation of the invention is to be used on plants, i.e. as a plant fungicide, it is not necessary that the detergent be harmless to the human skin and, in addition to the above-mentioned detergents, any of the many known detergents or wetting agents may be employed.

In preparing a dispersion according to this invention, it has also been found that a weak anhydrous acid is advantageously added to the glycerine or other polyhydric alcohol or polyhydric alcohol ether for the purpose of increasing the stability and effectiveness of the preparation. Any mild organic or inorganic acid can be used for this purpose, such as citric acid, oxalic acid, or tartaric acid, but it is preferred to use boric acid which is very weak and can therefore be used in comparatively large quantities to make the final product thicker. Moreover, boric acid is antiseptic and therefore it is advantageous from a therapeutic point of view. In addition, the boric acid apparently combines with glycerine in the course of manufacture of the dispersion, and it appears that the resulting compound combines with selenium dioxide as well and, for a reason unknown to me, favorably affects the high therapeutic effectiveness of the product.

The degree of dispersion, in the organic dispersion medium, of selenium disulfide, as well as of selenium monosulfide which, as a rule, accompanies the disulfide at least in traces, is far superior to that of the selenium disulfide and selenium sulfide in preparations employing an aqueous suspenison medium which are, in fact, suspended only and not colloidally dispersed in the aqueous medium. The particle size in the dispersion according to the present invention is in the vicinity of $1\mu\mu$ (or $10^{-7}$ cm.) as distinct from the particle size in an aqueous suspension which is of the order of $1\mu$ (or $10^{-4}$ cm.). As a result, the total surface of the particles for a given volume is approximately 1,000 times larger in the case of the non-aqueous colloidal dispersion of this invention than in the aqueous suspensions heretofore known. This greatly increased surface accounts, at least in part, for the very much greater effectiveness of such colloidally dispersed selenium disulfide for therapeutic use, which makes it possible to reduce very considerably the quantity of selenium disulfide per unit by weight of the dispersion, with consequent reduction in toxicity of the preparation and in the cost of production.

In order to more particularly describe the invention, some examples of dispersions according to the invention and the manner of preparing them are hereafter described.

*Example 1*

300 grams of anhydrous boric acid and from 5 to 10 grams of anhydrous sulfonated lauryl alcohol are dissolved in 1,000 grams of water-free glycerine by heating to a temperature not exceeding 200° C. Then 150 grams of selenium dioxide are dissolved in the solution at a temperature of about 150° C., and the mixture cooled to room temperature. Thereafter a stream of hydrogen sulfide is bubbled through the mixture for about 24 hours, the mixture being advantageously agitated during the introduction of the hydrogen sulfide.

If particularly finely dispersed ultra-colloidal particles are required, then vibration is imparted to the mixture by means of ultrasonic waves, for instance with the aid of a quartz crystal as a transducer. For normal therapeutic use however, that is for preparing a shampoo, a dispersion of selenium disulfide, which is about ten times more effective than known aqueous suspensions, is obtained without the use of ultrasonic vibration.

*Example 2*

20 grams of citric acid and from 5 to 10 grams of an alkyl aryl sulfonate (Santomerse D) are dissolved in 1,000 grams of water-free glycerine by heating to a temperature not exceeding 200° C. Then 150 grams of selenious acid are dissolved in the solution at a temperature of about 150° C., and the mixture cooled to room temperature. Thereafter a stream of hydrogen sulfide is bubbled through the mixture for about 24 hours, and the mixture agitated during the period of hydrogen sulfide introduction. As in the case of Example 1, ultrasonic waves may be used for producing particularly finely dispersed ultra-colloidal particles.

*Example 3*

The process described in Examples 1 and 2 is repeated except that use is made of 50 grams of tartaric acid instead of the boric acid and citric acids of Examples 1 and 2, respectively.

*Example 4*

350 grams of boric acid and from 5 to 10 grams of anhydrous sulfonated lauryl alcohol are dissolved in 1,200 grams of water-free ethylene glycol by heating to a temperature below 197° C. Then 150 grams of selenium dioxide are dissolved in the solution at a temperature of about 120° C., and the mixture cooled to room temperature. Thereafter a stream of hydrogen sulfide is bubbled through the mixture for about 24 hours, preferably while continuously agitating the mixture during that phase.

*Example 5*

350 grams of boric acid and from 5 to 10 grams of anhydrous alkyl aryl sulfonate (Nacconol NRSF) are dissolved in 1,200 grams of water-free ethylene glycol by heating to a temperature below 197° C. Then 200 grams of selenious acid are dissolved in the solution at a temperature of about 120° C., and the mixture cooled to room temperature. Thereafter a stream of hydrogen sulfide is bubbled through the mixture for about 24 hours, preferably while continuously agitating the mixture during that phase.

In each of the above examples, the product obtained contains approximately 10% by weight of selenium disulfide. By increasing the quantity of selenium dioxide or of selenious acid, as the case may be, the percentage of selenium disulfide in the dispersion may be increased even to 50% by weight. By reducing the quantity of selenium dioxide or selenious acid however, the percentage of selenium disulfide in the dispersion may be reduced to less than 10% by weight.

Stabilization of the selenium disulfide in the dispersion is effected in each case by the acid introduced into the dispersion medium before the reaction with hydrogen sulfide, the quantity of the acid being chosen to adjust the pH of the dispersion to between about 2 and 6.6. Instead of introducing the acid into the dispersion medium before the reaction with hydrogen sulfide, it is also possible to introduce it during that reaction, or thereafter.

While the preparations of the invention are preferably prepared by the method described above involving in situ precipitation of selenium disulfide in the non-aqueous polyhydric alcohol medium, I also contemplate the making of these preparations by the use of separately produced selenium disulfide which is colloidally distributed in the non-aqueous polyhydric alcohol medium by mechanical means such as a colloid mill. Thus, as described in U.S. Letters Patent 1,860,154, selenium disulfide is suitably prepared from a solution of aluminum chloride into which is passed a current of hydrogen sulfide, selenium disulfide being produced according to the equation $$2H_2S + H_2SeO_3 \rightarrow SeS_2 + 3H_2O$$

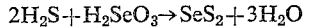

The precipitated selenium disulfide is filtered, washed and dried.

In accordance with another method of preparation described in said Letters Patent 1,860,154, sulfur and selenium are mixed together in the proportion of 1 molecular weight of selenium to 2 molecular weights of sulfur and the mixture heated to about 225° C. The plastic mass which forms upon cooling is allowed to stand for several days during which it is converted into a hard brittle state, which is then mechanically ground into powdered selenium disulfide.

To make the preparations of my invention, powdered selenium disulfide prepared by either of the above-mentioned methods or the like is mixed with one of the polyhydric alcohols or ethers specified above, preferably glycerine, which has previously been heated with one of the mild acids described above, preferably boric acid, at 150° C. for about 20 minutes and then cooled to a temperature below 100° C., e.g. room temperature. The powdered selenium disulfide is added in the amount of 0.25 to 2.5% by weight of the mixture and 5 to 10% by weight of the detergent is also suitably added prior to passage of the mixture through the colloid mill. After all of the above-mentioned ingredients have been combined, the mixture is passed through a colloid mill to provide a colloidal dispersion of the selenium disulfide in the organic dispersion medium having a particle size substantially smaller than $10^{-4}$ cm. and approaching $10^{-7}$ cm. Any of the known efficient colloid mills may be employed for this purpose such as the Charlotte mill, the Gaulin mill, and the Noblewood mill described on page 1169 of the Chemical Engineers Handbook by John H. Perry, 3rd ed., or Plauson's mill or Plauson's mill modified by Oderberg as described, for example, on pages 62 and 63 of Colloidal Phenomena by E. A. Hauser (1939).

The following examples illustrate this aspect of the invention.

*Example 6*

300 grams of boric acid are mixed with 1,000 grams of glycerine and heated at 150° C. for twenty minutes. The heated mixture is then cooled to about 90° C. and there are added to the mixture 1.0% by weight of selenium disulfide prepared by precipitation from a solution of aluminum chloride with hydrogen sulfide, and 10 grams of anhydrous sulfonated lauryl alcohol. The mixture is then passed through a Plauson colloid mill to produce a colloid dispersion having a particle size of $10^{-6}$ cm.

*Example 7*

300 grams of boric acid are mixed with 1,000 grams of glycerine and heated at 150° C. for twenty minutes. The heated mixture is then cooled to about 95° C. and there are added to the mixture 1.5% by weight of selenium disulfide prepared by precipitation from a solution of aluminum chloride with hydrogen sulfide prepared by melting selenium and sulfur as described in U.S. Letters Patent 1,860,154, and 10 grams of anhydrous alkyl aryl sulfonate (Nacconol NRSF). The mixture is then passed through a Plauson colloid mill to produce a colloid dispersion having a particle size of $10^{-6}$ cm.

The water-free concentrate of selenium disulfide produced as above-described and illustrated in the examples can be stored almost indefinitely in a cool, dark space.

While active stabilized colloidal selenium disulfide is the essential active substance in the dispersion, colloidal selenium sulfide and/or colloidal selenium and/or colloidal sulfur may be included in the dispersion to any desired extent, all or some of these components being often present in selenium disulfide dispersions, at least in minor quantities or in traces.

To prepare a therapeutic shampoo for the treatment of dandruff or seborrhoeic dermatitis of the scalp, the non-aqueous selenium disulfide concentrate obtained as above-described is diluted, if it contains more than 0.25% by weight of selenium disulfide, with glycerine or other polyhydric alcohol or ethers of the class specified above, or with water, so that the final product will contain between 0.25 and 0.5% by weight of chemically-active and stable selenium disulfide. Additional quantities of detergent are also suitably added so that the detergent represents 10 to 20% of the total composition. If desired, foaming agents such as those described in the above-mentioned Letters Patent No. 2,694,669 and/or a perfume may also be added. For example, a particularly efficacious shampoo is obtained from the concentrate of Example 1 by diluting it with glycerine to 0.25% by weight selenium disulfide and adding additional anhydrous sulfonated lauryl alcohol to provide a total of 18% by weight of the total product.

A preparation containing 0.25% selenium disulfide produced according to the invention is equally effective as a preparation containing 2.5% selenium disulfide in aqueous suspension. For preparing a remedy for veterinary use, i.e. for treatment of ailments in animals, e.g. horses, the dispersion obtained according to the above examples may be used after dilution without the further addition of detergent, foaming agent or perfume. If it is desired to increase the viscosity of the dispersion, e.g. for topical application to the skin, a thickening agent is suitably added, the quantity of thickening agent, e.g. 10 to 20% by weight depending upon the viscosity desired. Examples of suitable thickening agents are carboxy-methyl-cellulose, bentonite, starch, and like materials well known for this purpose.

To provide a plant fungicide from the dispersions prepared according to any one of the above examples, the dispersion is suitably diluted in the manner above indicated with an organic solvent and/or with water. Any of the known wetting agents used in dispersions adapted to be applied to plants is advantageously added to the solution to increase miscibility, to improve adherence of the dispersion to the plant tissue and to promote its penetration. Thus 10 to 20% by weight of the wetting agent is suitably used.

It will be understood that various changes and modifications may be made in the embodiments of the invention described above without departing from the scope of the invention as defined in the appended claims and it is intended therefore that all matter contained in the foregoing description shall be interpreted as illustrative only and not as limitative of the invention.

What I claim and desired to secure by Letters Patent is:

1. A preparation comprising a liquid non-aqueous organic dispersion medium selected from the group consisting of a polyhydric alcohol containing not more than 3 carbon atoms in the molecule and the lower alkyl ethers thereof, and activated stabilized selenium disulfide colloidally dispersed in said organic dispersion medium, said dispersion medium thereby being the continuous phase and said selenium disulfide being a discontinuous phase of the dispersion, the pH of the preparation being between about 2 and 6.6 and said selenium disulfide being present in an amount up to 0.5%.

2. A preparation as defined in claim 1, wherein said organic dispersion medium is substantially water free and said selenium disulfide is present in the amount of about 0.25 to about 0.5%.

3. The preparation defined in claim 1, wherein the dispersion medium is a di-hydric alcohol.

4. The preparation defined in claim 1, wherein the dispersion medium is ethylene glycol.

5. The preparation defined in claim 1 containing, additionally, in colloidal dispersion, at least one substance selected from the group consisting of selenium sulfide, selenium and sulfur.

6. The preparation defined in claim 1, wherein the dispersion medium is glycerine.

7. The preparation defined in claim 6 containing, additionally, in colloidal dispersion, at least one substance selected from the group consisting of selenium sulfide, selenium and sulfur.

8. A shampoo composition comprising a non-aqueous colloidal dispersion of up to 0.5% of activated selenium disulfide dispersed in a liquid non-aqueous organic dispersion medium selected from the group consisting of a polyhydric alcohol containing not more than 3 carbon atoms in the molecule and the lower alkyl ethers thereof, and a detergent, said dispersion medium thereby being the continuous phase and said selenium disulfide being a discontinuous phase of the dispersion, the pH of said composition being between about 2 and 6.6.

9. A shampoo composition comprising a non-aqueous colloidal dispersion of up to 0.5% of activated selenium disulfide in glycerine, and a detergent, said glycerine thereby being the continuous phase and said selenium disulfide being a discontinuous phase of the dispersion, the pH of said composition being between about 2 and 6.6.

10. A shampoo composition comprising a non-aqueous dispersion of up to about 0.5% of active selenium disulfide dispersed in glycerine, and containing alkyl aryl sulfonate, said glycerine thereby being the continuous phase and said selenium disulfide being a discontinuous phase of the dispersion, and an acid selected from the group consisting of boric acid, oxalic acid, citric acid and tartaric acid, to provide a pH of about 2 and 6.6.

11. The shampoo composition as defined in claim 10, containing in colloidal dispersion a small but effective amount of at least one of the substances selected from the group consisting of selenium sulfide, selenium, and sulfur.

References Cited in the file of this patent

UNITED STATES PATENTS

| 1,860,336 | Nordlander | May 24, 1932 |
| 1,969,166 | Von Hoessle | Aug. 7, 1934 |
| 2,021,143 | Calcott et al. | Nov. 19, 1935 |
| 2,160,030 | Nitsche | Nov. 19, 1935 |
| 2,694,669 | Baldwin et al. | Nov. 16, 1954 |

OTHER REFERENCES

Mellor: Comp. Treatise on Inorganic and Theoretical Chemistry, vol. X, Longmans, Green and Co., N.Y., 1930, pp. 915–919.

Chemical Abstracts, vol. 33, January-March 1939, page 1451, Stetson, Am. Perfumer and Ess. Oil Review, April 1953, vol. 61, No. 4, pp. 285–288.

Spalton: Pharmaceutical Emulsions and Emulsifying Agents, Chemist and Druggist, London (received in Patent Office Scientific Library August 1950), page 115 relied on.

Scheflan: Handbook of Solvents, Van Nostrand Co., Inc., New York (1953), page 415.

Ayres et al.: Arch. of Dermatology and Syphilology, vol. 69, May 1954, pp. 615–616.

Remington: Practice of Pharmacy, 9th Ed., Mack Publ. Co., Easton, Pa., page 169.